United States Patent
Méndez Olvera (10) Patent No.: US 12,459,450 B2
(45) Date of Patent: Nov. 4, 2025

(54) WIRING PROTECTOR ASSEMBLY

(71) Applicant: NISSAN NORTH AMERICA, INC., Franklin, TN (US)

(72) Inventor: José Ángel Méndez Olvera, Naucalpan (MX)

(73) Assignee: NISSAN NORTH AMERICA, INC., Franklin, TN (US)

( * ) Notice: Subject to any disclaimer, the term of this patent is extended or adjusted under 35 U.S.C. 154(b) by 160 days.

(21) Appl. No.: 18/073,349

(22) Filed: Dec. 1, 2022

(65) Prior Publication Data

US 2024/0181978 A1    Jun. 6, 2024

(51) Int. Cl.
*B60R 16/02* (2006.01)
*H02G 3/04* (2006.01)

(52) U.S. Cl.
CPC ....... *B60R 16/0215* (2013.01); *H02G 3/0412* (2013.01); *H02G 3/0487* (2013.01)

(58) Field of Classification Search
CPC . B60R 16/0215; H02G 3/0412; H02G 3/0487
See application file for complete search history.

(56) References Cited

U.S. PATENT DOCUMENTS

| | | | |
|---|---|---|---|
| 5,597,980 A * | 1/1997 | Weber | H02G 3/0418 174/72 A |
| 5,813,381 A * | 9/1998 | Kakimoto | B60R 16/0215 123/195 A |
| 6,903,275 B1 * | 6/2005 | Jetton | B60R 16/0215 174/72 A |
| 8,563,866 B2 | 10/2013 | Oga et al. | |
| 2013/0277107 A1 * | 10/2013 | Hara | B60R 16/0215 174/72 A |
| 2013/0313376 A1 * | 11/2013 | Shirey | B60R 16/0215 248/65 |
| 2014/0263901 A1 * | 9/2014 | Schaffer | B60R 16/00 248/221.11 |
| 2015/0083462 A1 | 3/2015 | Yoshida et al. | |
| 2016/0244003 A1 * | 8/2016 | Chaanine | H02G 3/04 |
| 2018/0015894 A1 * | 1/2018 | Zaldivar Ortiz | B60R 16/0215 |
| 2018/0118136 A1 * | 5/2018 | Carremm | F16L 3/26 |
| 2019/0036313 A1 * | 1/2019 | Okamoto | B60R 16/0215 |
| 2019/0061651 A1 * | 2/2019 | Takahashi | H02G 3/0487 |
| 2021/0094486 A1 * | 4/2021 | Fuchigami | H01B 7/0045 |
| 2021/0273433 A1 * | 9/2021 | Aimu | B60R 16/0215 |
| 2022/0105883 A1 * | 4/2022 | Schmadeke | B60R 16/0215 |
| 2024/0140333 A1 * | 5/2024 | Yamazaki | H02G 3/0487 |

FOREIGN PATENT DOCUMENTS

| | | | | |
|---|---|---|---|---|
| JP | 2002225648 A | | 8/2002 | |
| KR | 101890244 B1 | * | 8/2018 | ......... B60R 16/0215 |

OTHER PUBLICATIONS

English Translation JP2012/117384 (Year: 2012).*
English Translation JP2007/221875 (Year: 2007).*

* cited by examiner

*Primary Examiner* — Steven T Sawyer
(74) *Attorney, Agent, or Firm* — Global IP Counselors, LLP (57) ABSTRACT

A wiring protector assembly that includes a protector member and a cover. The cover is dimensioned and shaped to attach to the protector member with a cable receiving cavity defined therebetween, the protector member has a first open end, a second open end and a branch open end that are open to the cable receiving cavity.

6 Claims, 10 Drawing Sheets

WIRING PROTECTOR ASSEMBLY

BACKGROUND

Technical Field

The present disclosure generally relates to wiring protector assembly. More specifically, the present disclosure relates to wiring protector assembly that is heat resistant and is shaped to receive portions of an electric cable or wiring harness and limit movement of the portions of the electric cable or wiring harness with the electric cable or wiring harness being positioned adjacent a vehicle engine proximate and an exhaust manifold.

Background Information

As vehicles downsize and the volume within an engine compartment of the vehicle in increasingly filled with more and more accessories, conduits and circuitry, is important to prevent heat producing portions of the engine from having a negative effect on other elements and features within the engine compartment.

SUMMARY

One object of the present disclosure is to provide a wiring protector assembly that retains an electrical cable or cables, such as a positive cable attached to a battery, from contacting heated portions of an engine in an engine compartment.

In view of the state of the known technology, one aspect of the present disclosure is to provide a wiring protector assembly with a protector member and a cover. The cover is dimensioned and shaped to attach to the protector member with a cable receiving cavity defined therebetween. The protector member has a first open end, a second open end and a branch open end that are open to the cable receiving cavity.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
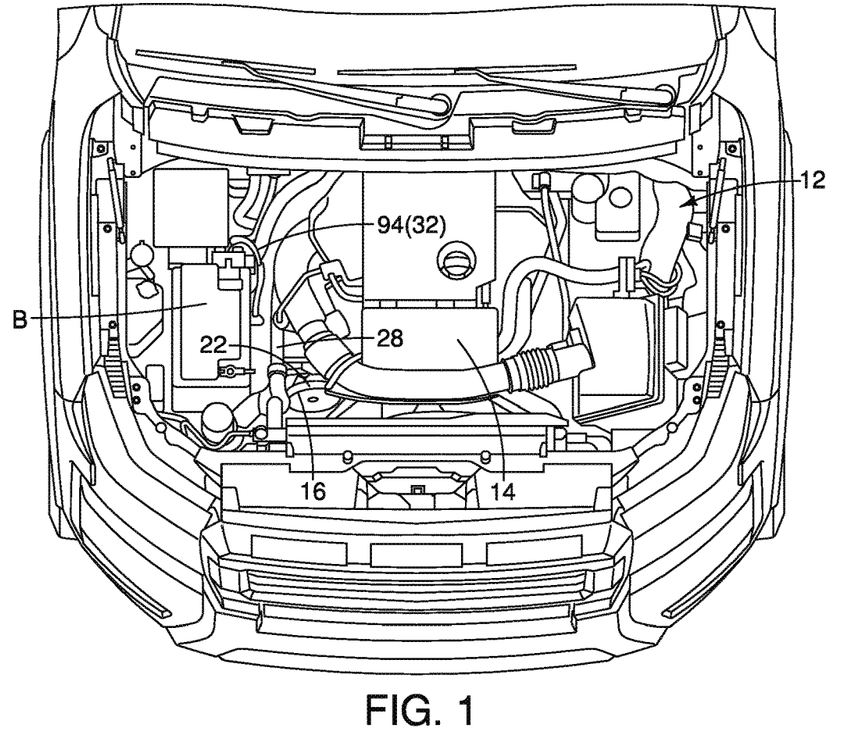
FIG. 1 is a top view of a front portion of a vehicle with the engine hood removed showing an engine compartment with an engine, battery and various accessories in accordance with an exemplary embodiment.

Referring initially to FIG. 1, a vehicle 10 having an engine compartment 12 with an engine 14 is illustrated in accordance with an exemplary embodiment.

Figure 2:
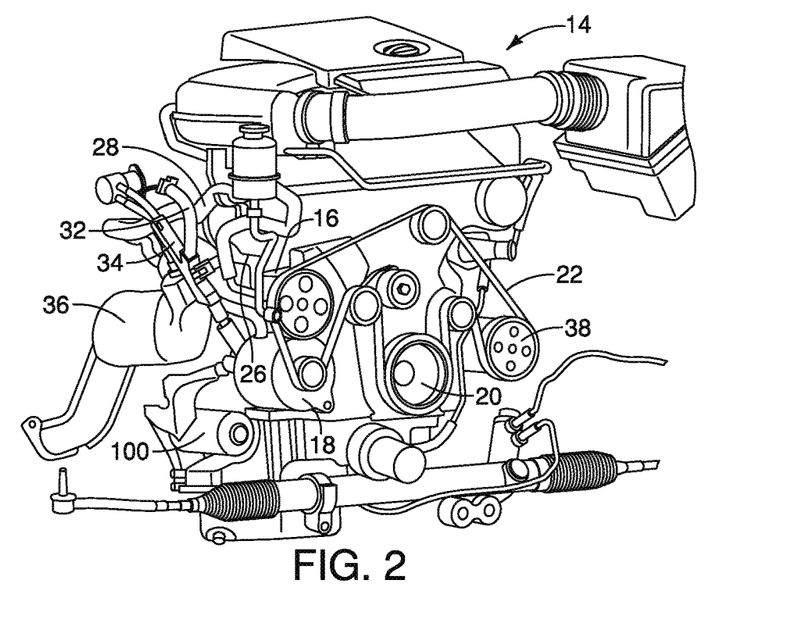
FIG. 2 is a front perspective view of the engine removed from the engine compartment and the vehicle showing engine accessories powered by an endless belt, and further showing a wiring protector assembly in accordance with the exemplary embodiment.
Figure 3:
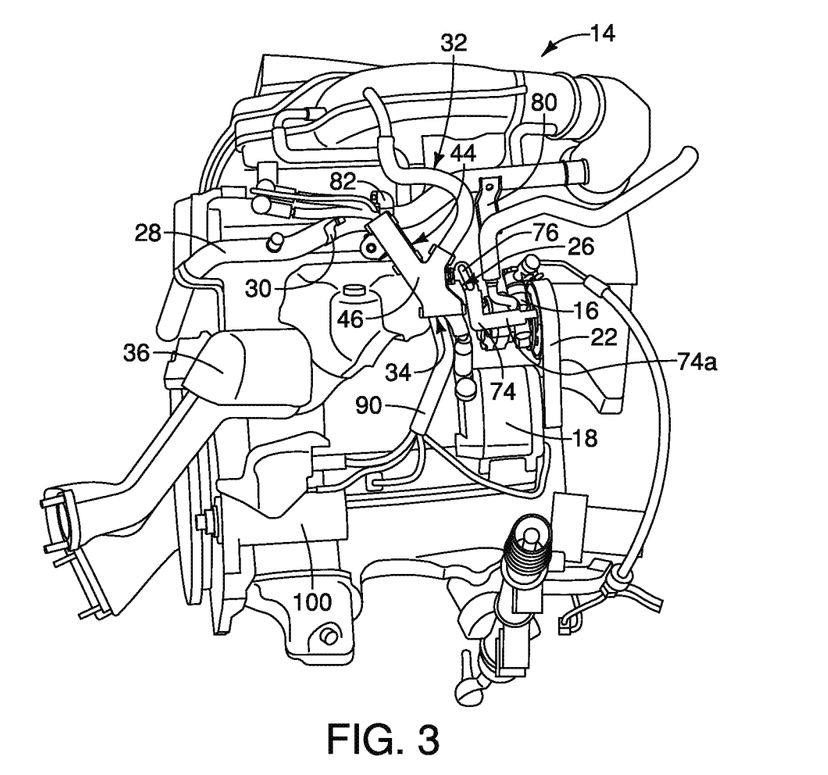
FIG. 3 is a side view of the engine showing an exhaust manifold, an electrical cable, a cover of the wiring protector assembly, a first bracket, a coolant conduit, and engine accessories in accordance with the exemplary embodiment.

As shown in FIGS. 2 and 3, the engine 14 include various accessories and components, including a power steering pump 16, an electricity generating alternator 18, a main pulley 20 connected to the crankshaft (not shown) of the engine 14 and other accessories and components powered by rotation of an endless belt 22. Since the crankshaft, power steering pump 16, alternator 18, main pulley 20 and endless belt 22 are conventional features well known in the art, further description of these accessories and components is omitted for the sake of brevity.

The engine 14 also includes or has connected thereto, a first bracket 26, a coolant conduit 28, a hose bracket 30, an electrical cable 32, a wiring protector assembly 34, an exhaust manifold 36 and an AC compressor 38. As shown in FIG. 2, accessories such as the power steering pump 16, the electricity generating alternator 18 and the AC compressor 38 are all powered by rotation of the main pulley 20 transmitted via the endless belt 22, in a conventional manner.

Figure 4:
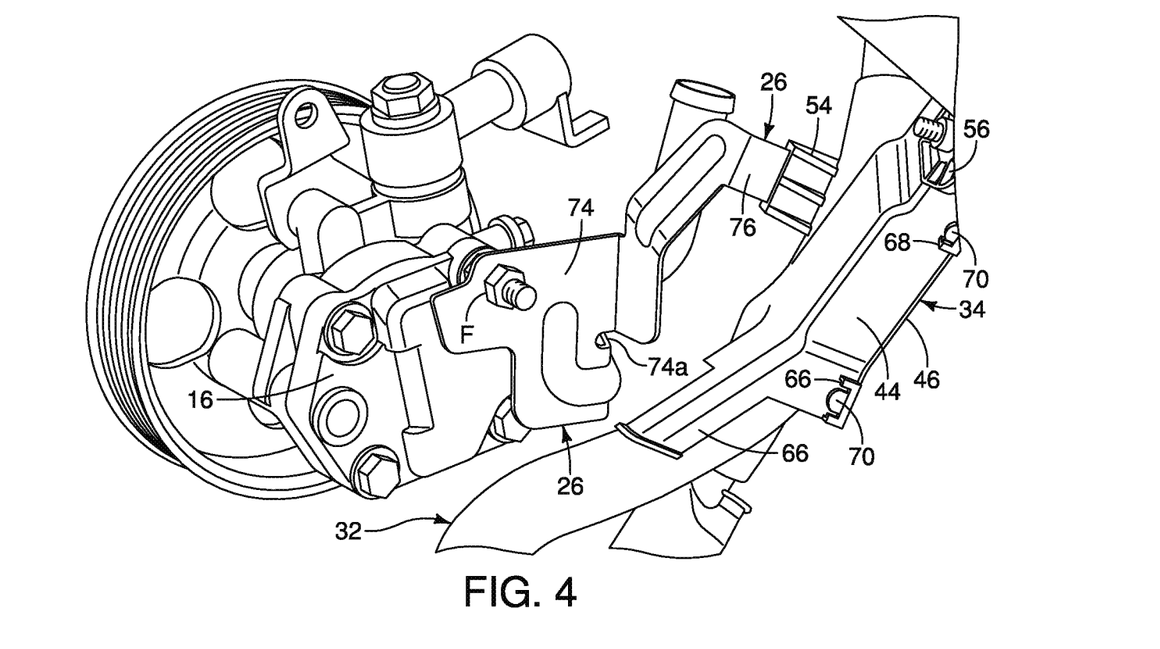
FIG. 4 is a rear perspective view of the accessory, first bracket and the wiring protector assembly removed from the engine in accordance with the exemplary embodiment.
Figure 5:
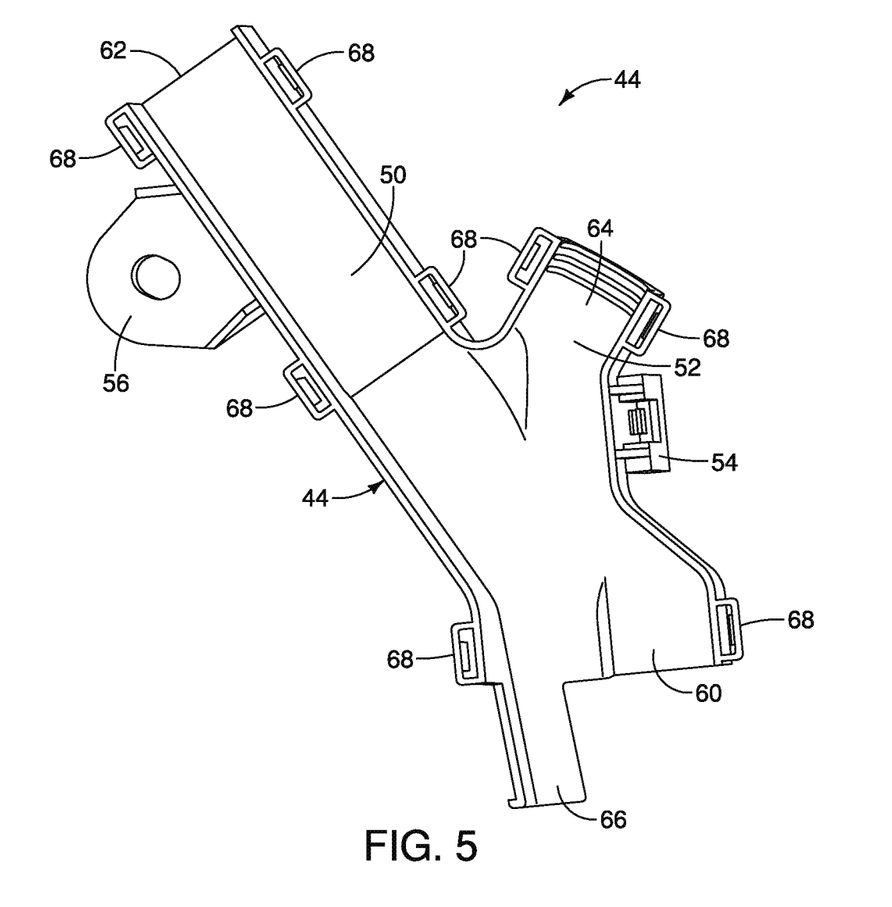
FIG. 5 is a side view of a main body of the wiring protector assembly with the cover removed, showing cable receiving cavities, a bracket receiving structure, an attachment flange, a lower opening, an upper opening, a branch opening, a downwardly extending projection and a plurality of receiving portions in accordance with the exemplary embodiment.
Figure 6:
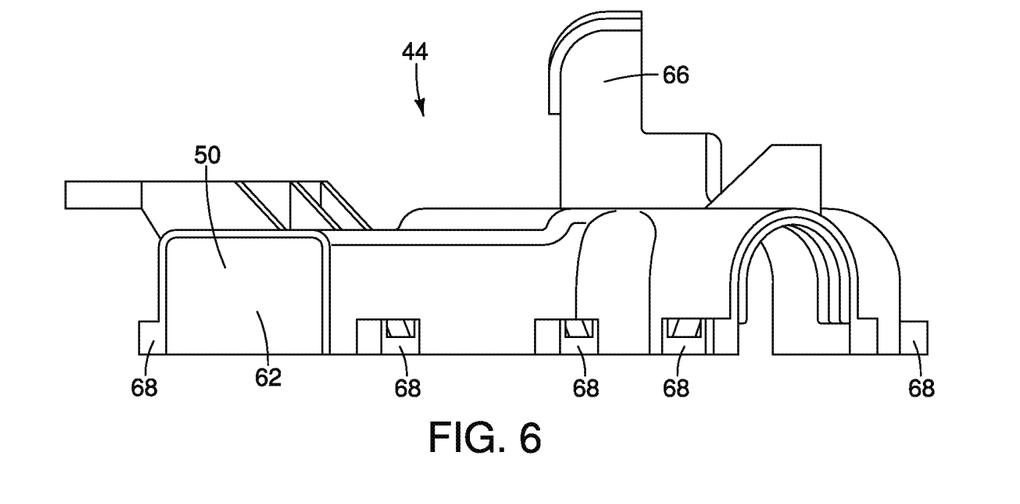
FIG. 6 is a top view of the main body of the wiring protector assembly with the cover removed, showing the attachment flange, the upper opening, the branch opening, the downwardly extending projection and some of the plurality of receiving portions in accordance with the exemplary embodiment.
Figure 7:
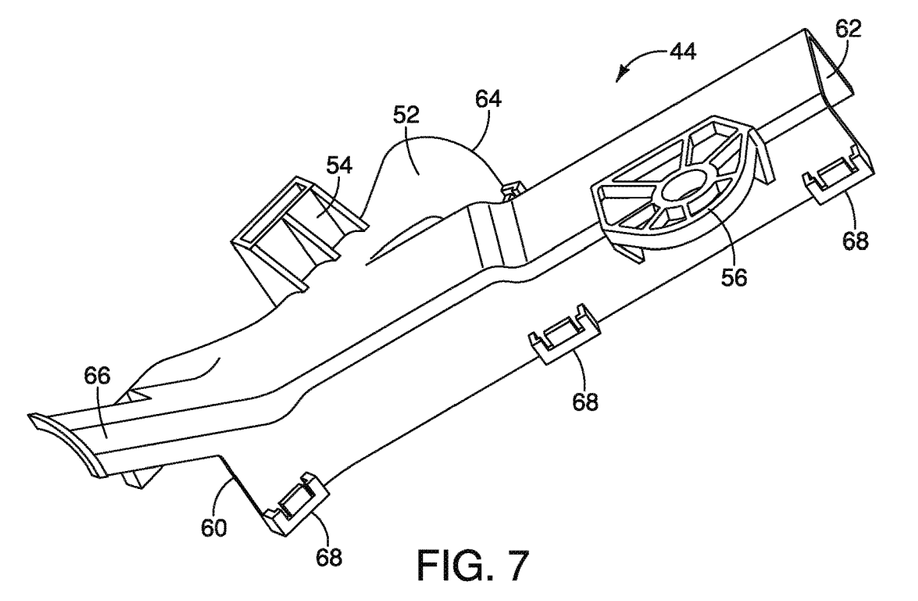
FIG. 7 a perspective view of the main body of the wiring protector assembly with the cover removed, showing the bracket receiving structure, the attachment flange, the lower opening, the upper opening, the branch opening, the downwardly extending projection and several of the plurality of receiving portions in accordance with the exemplary embodiment.
Figure 8:
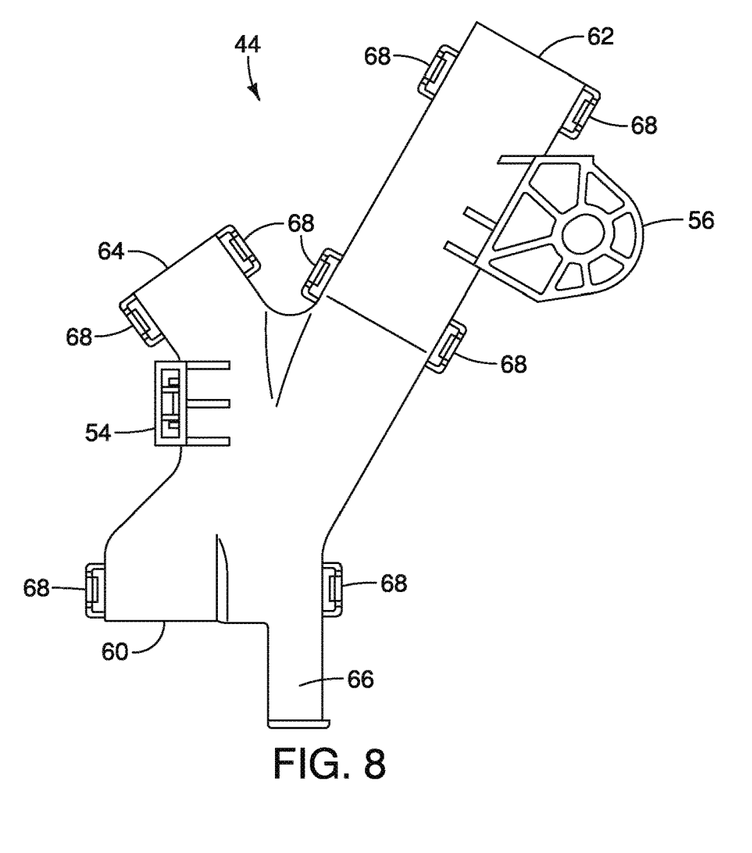
FIG. 8 is another side view of the main body of the wiring protector assembly showing the bracket receiving structure, the attachment flange, the lower opening, the upper opening, the branch opening, the downwardly extending projection and the plurality of receiving portions in accordance with the exemplary embodiment.

As shown in FIGS. 3 and 4, the first bracket 26 is connected to the power steering pump 16 and the wiring protector assembly 34 in a manner described in greater detail below. As shown in FIGS. 17-20, the hose bracket 30 is attached to the coolant conduit 28 and is further connected to the wiring protector assembly 34, as described further below.

Figure 20:
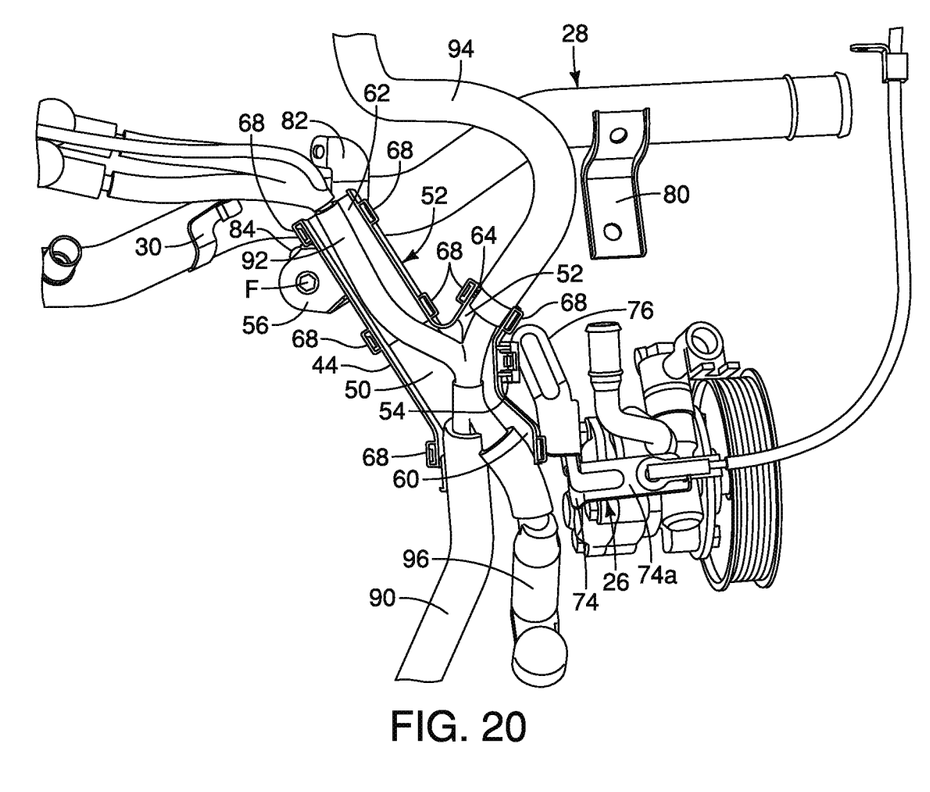
FIG. 20 is a side view of the coolant conduit, the electrical cable, the wiring protector assembly with the cover removed, the first bracket and the accessory showing the electrical cable and its various branches installed within the cavities of the wiring protector assembly in accordance with the exemplary embodiment.

As shown in FIGS. 1 and 3, the electrical cable 32 extends from a battery B (FIG. 1) along an exterior area of the engine 14 (also referred to as a motor 14) to a starter motor 100 and further to various electrical components (not shown) within the vehicle 10. Portions of the electric cable 32 further extend through the wiring protector assembly 34, as shown in FIG. 20 and described in greater detail below.

Figure 14:
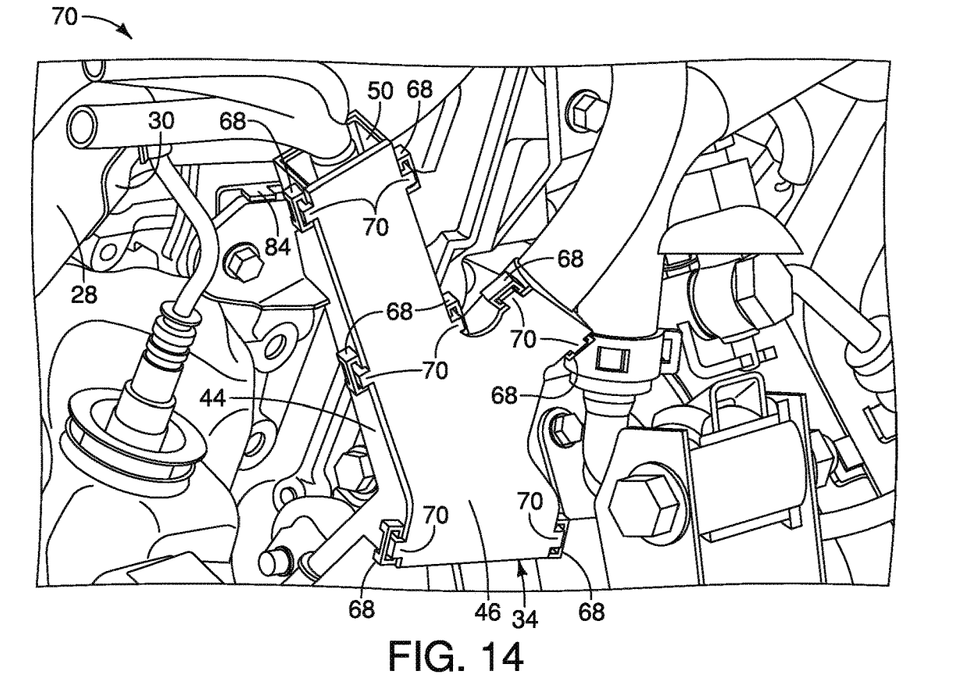
FIG. 14 is a perspective view of a portion of the engine showing the main body and cover of the wiring protector assembly attached to one another, and showing the attachment flange of the main body connected to a main bracket of the coolant conduit in accordance with the exemplary embodiment.

The wiring protector assembly 34 is shown removed from the engine 14 in FIGS. 5-8. The wiring protector assembly 34 includes a main body 44 (FIGS. 5-8) and a cover 46 (shown in FIGS. 3, 14 and 19). Both the main body 44 and the cover 46 are made of a heat resistant material, such as, for example, polyamide, nylon, Polytetrafluoroethylene (PTFE). Polyether ether ketone (PEEK), or metallic materials. More specifically, the protector member 44 (main body 44) and the cover 46 are made of at least one heat resistant material able to withstand temperatures greater than the temperatures reached in areas adjacent to the exhaust manifold 36 of the engine 14 while the engine 14 is operating.

The main body 44 of the wiring protector assembly 34 is shown with the cover removed in FIGS. 5-8. The protector member 44 (the main body 44) defines a main cavity 50 and a branch cavity 52 dimensioned to receive corresponding portions of the electrical cable 32 as described in greater detail below.

The protector member 44 of the wiring protector assembly 34 also includes a bracket receiving structure 54 that is dimensioned and shaped for connection to the first bracket 26 in a manner described below.

The main body 44 of the wiring protector assembly 34 also includes an attachment flange 56 with a fastener receiving aperture for attachment to the hose bracket 30 of the coolant conduit 28 of the engine 14 (also referred to as the vehicle motor 14).

The main body 44 further defines a lower opening 60 (first open end 60), an upper opening 62 (second open end 62) and a branch opening 64 (branch open end 64). The lower opening 60 and the upper opening 62 are open to the main cavity 50. The branch opening 64 is open to the branch cavity 52. The main body 44 also includes a downwardly extending projection 66.

The main body 44 also includes a plurality of receiving structures 68 located along outer peripheral edges thereof.

Figure 9:
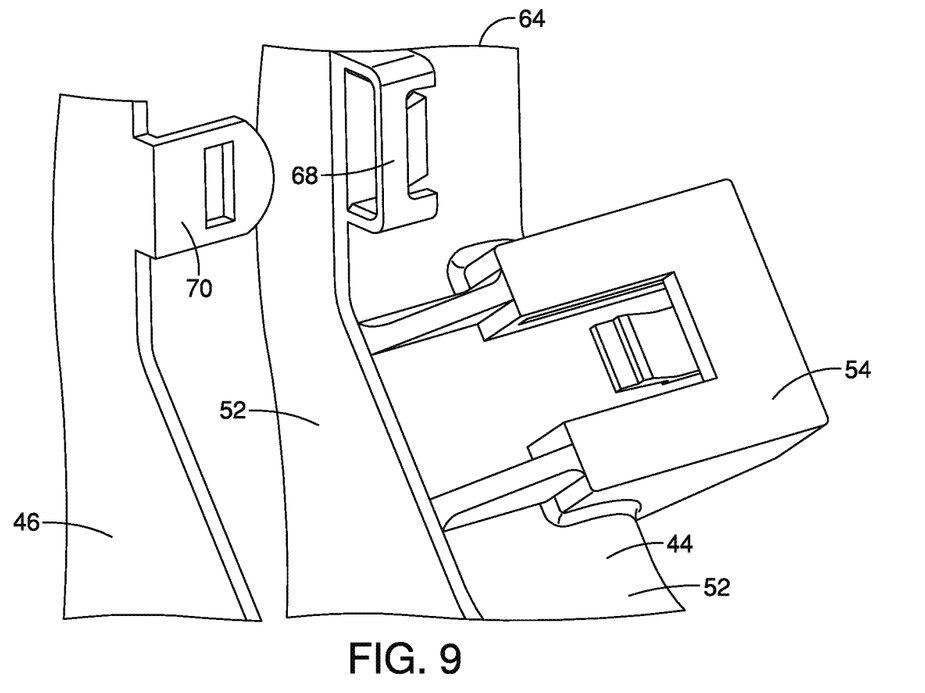
FIG. 9 is a perspective view of a portion of the main body of the wiring protector assembly showing a snap-fitting projection of the cover removed from one of the plurality of receiving portions in accordance with the exemplary embodiment.
Figure 10:
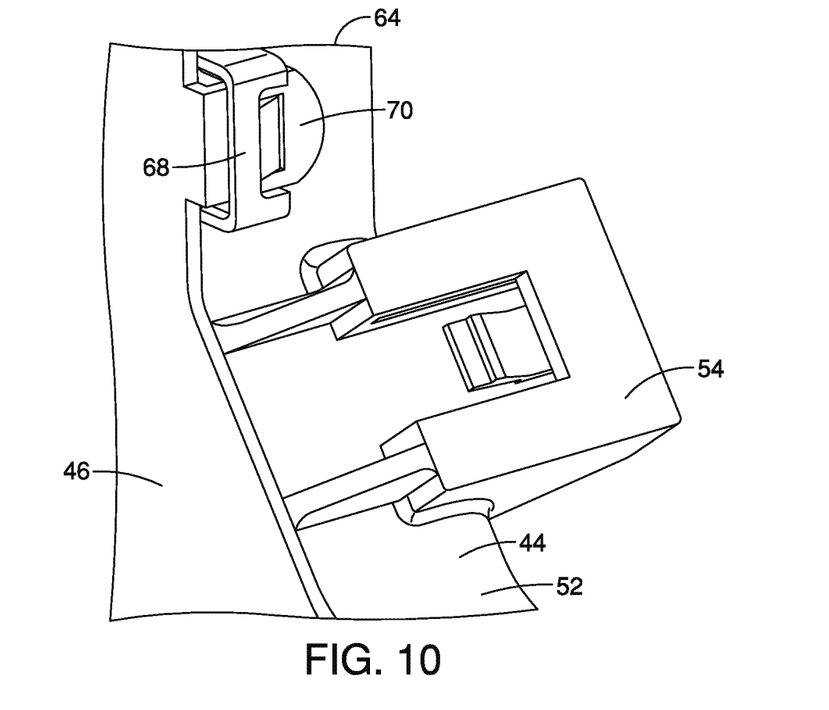
FIG. 10 is a perspective view similar to FIG. 9 of the portion of the main body of the wiring protector assembly showing the snap-fitting projection of the cover inserted into one of the plurality of receiving portions in accordance with the exemplary embodiment.

The cover 46 is dimensioned and shaped to attach to the protector member 44 covering the cavities 50 and 52 and the portions of the electric cable 32 fitted within the cavities 50 and 52. The cover 46 is formed with a plurality of snap-fitting projections 70 are positioned to fit into the plurality of receiving structures 68 of the main body 44 and snap-fit thereto, as shown in FIGS. 9 and 10. Alternatively, the protector member 44 can be provided with the plurality of snap-fitting projections 70 and the cover 46 can be provided with the plurality of receiving structures 68. Hence, one of the protector member 44 and the cover 46 includes the plurality of snap-fitting structures 68 and the other of the protector member 44 and the cover 46 includes the plurality of snap-fitting projections 70 that are shaped and dimensioned to fit into corresponding ones of the plurality of snap-fitting structures 68 thereby fixedly attaching the cover 46 to the protector member 44.

The bracket receiving structure 54 of the main body 44 is dimensioned and shaped for connection to a portion of the first bracket 26, as is described further below.

Figure 11:
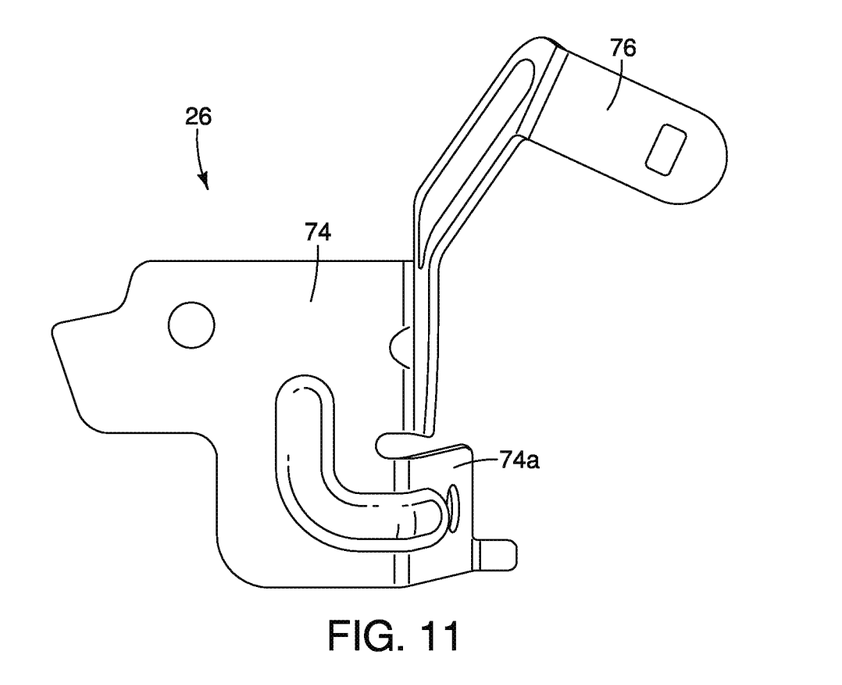
FIG. 11 is a rear view of the first bracket removed from the engine showing a first attachment portion that attaches to a rear side of the accessory, a forward bracket portion that attaches to a lateral side of the accessory and a second attachment portion that attaches to the bracket receiving structure of the main body of the wiring protector assembly in accordance with the exemplary embodiment.
Figure 12:
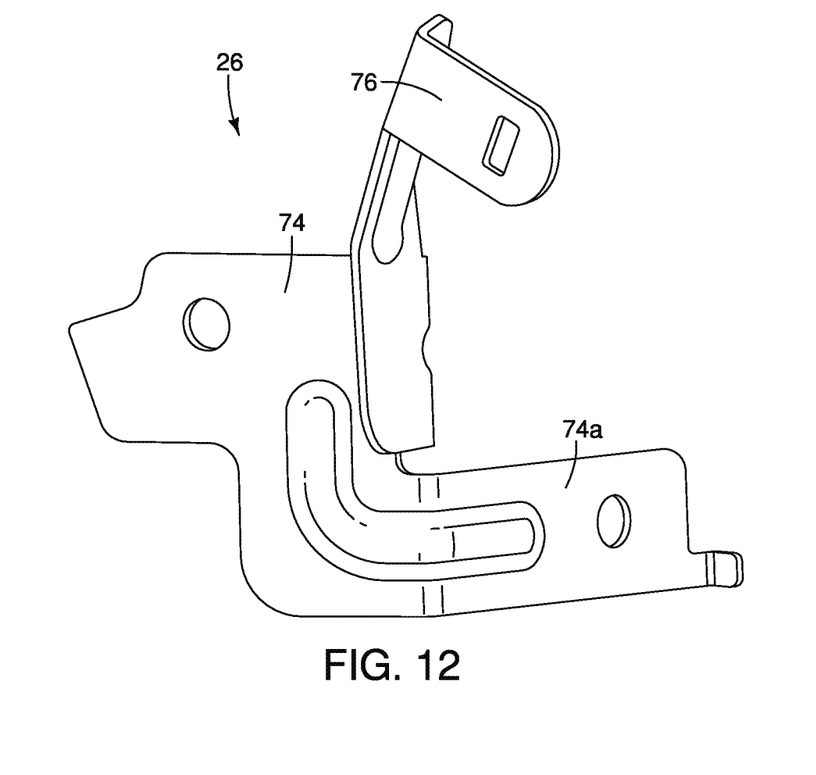
FIG. 12 is a perspective rear view of the first bracket removed from the engine showing the first attachment portion, the forward bracket portion and the second attachment portion in accordance with the exemplary embodiment.
Figure 13:
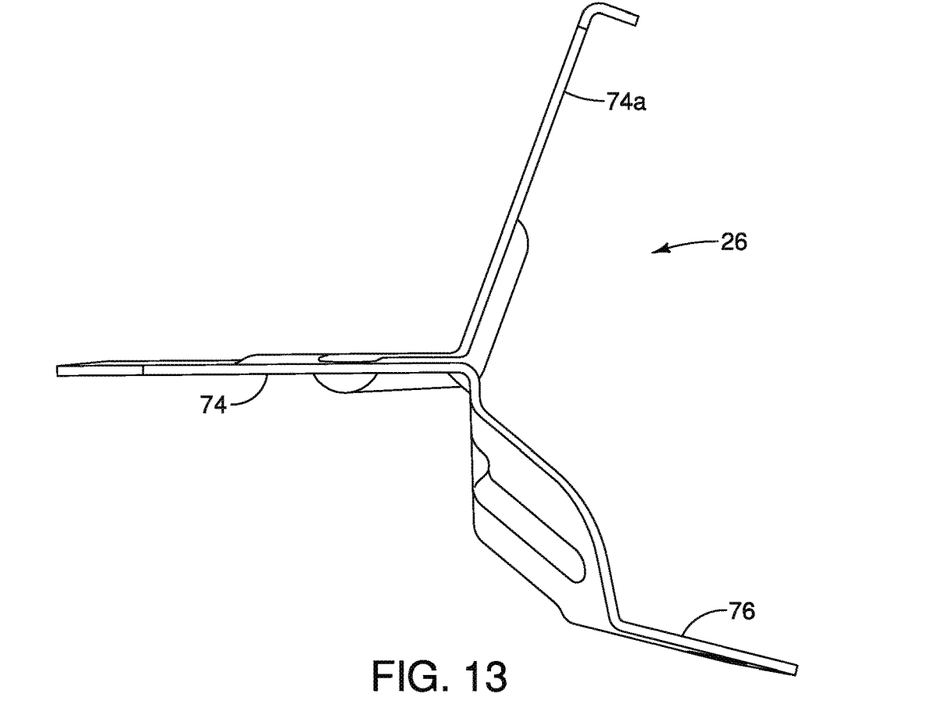
FIG. 13 is a top view of the first bracket removed from the engine showing the first attachment portion, the forward bracket portion and the second attachment portion in accordance with the exemplary embodiment.

A description of the first bracket 26 is now provided with initial reference to FIGS. 11-13. The first bracket 26 is a metal bracket bent and shaped as shown in FIGS. 11-13. The first bracket 26 has a first attachment portion 74 and a second attachment portion 76. The first attachment portion 74 is dimensioned and shaped to attach to one of the accessories of the vehicle motor 14 (the engine 14). As shown in FIGS. 2-4 and 20 in the depicted embodiment, the accessory is the power steering pump 16. The first attachment portion 74 includes a forward bracket portion 74a that is fixed to a lateral side surface of the power steering pump 16 via a fastener (not shown) and the first attachment portion 74 is fixed via a fastener F to the back side of the power steering pump 16. The forward bracket portion 74a and the first attachment portion 74 are approximately perpendicular to one another, as shown in FIGS. 11 and 13. The second attachment portion 76 is dimensioned and shaped to snap-fit to the bracket receiving structure 54, as shown in FIGS. 4, 15-16 and 20.

Figure 17:
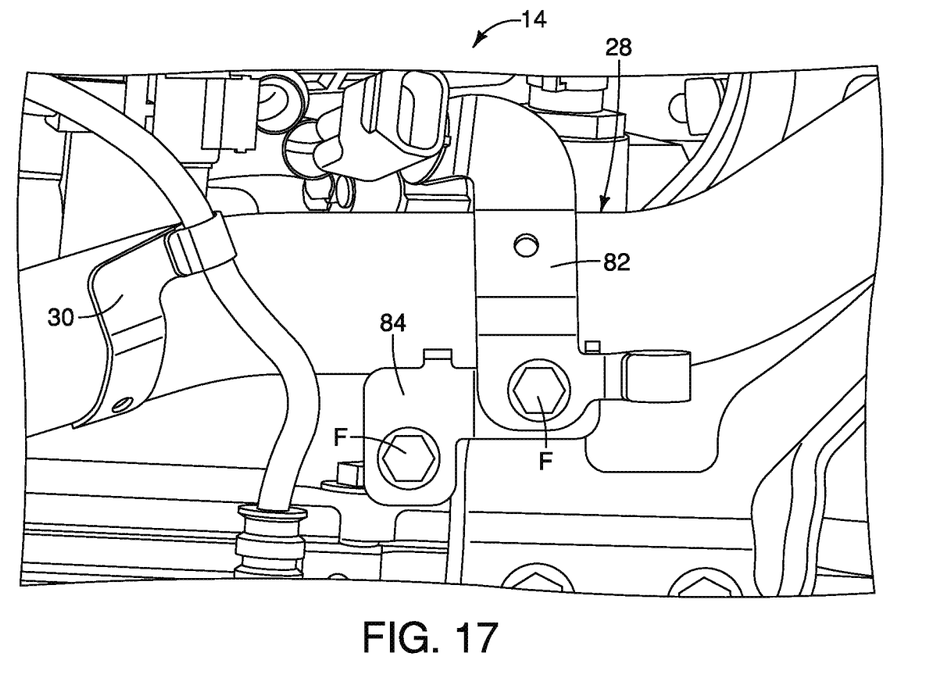
FIG. 17 is a side view of the engine with the electric cable and the wiring protector assembly removed showing the coolant conduit with a main bracket attached thereto, and a secondary bracket fastened to a lower end of the main bracket in accordance with the exemplary embodiment.
Figure 18:
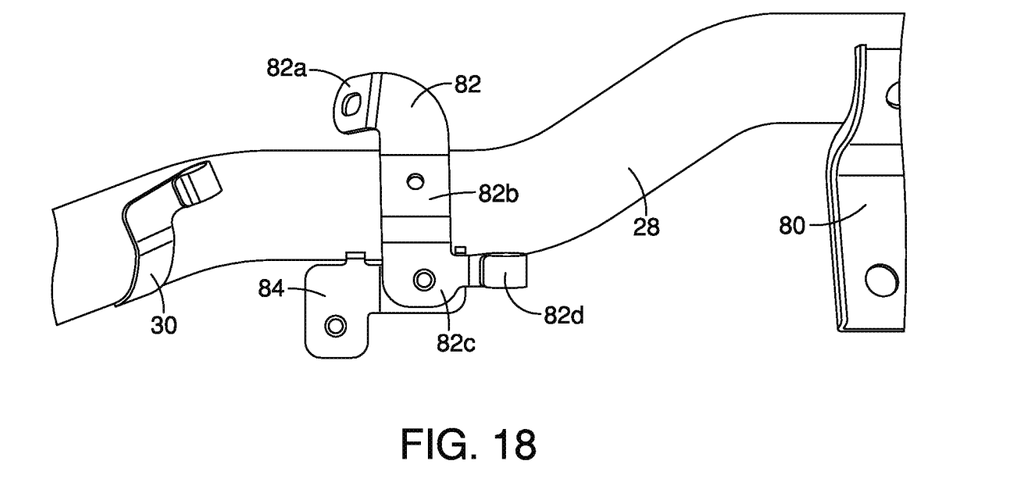
FIG. 18 is a side view the coolant conduit removed from the engine showing the main bracket attached thereto, and the secondary bracket in position for fastening to the lower end of the main bracket in accordance with the exemplary embodiment.

A description of the coolant conduit 28 is now provided with initial reference to FIGS. 17-18 and 20. The coolant conduit 28 (for example, a coolant hose) includes a retainer bracket 80, a main bracket 82, the hose bracket 30 and a secondary bracket 84. The coolant conduit 28 has a forward end that connects to a radiator (not shown) of the engine 14 and a rearward end that connects to a port (not shown) of the engine 14 for circulating water through the engine 14 in a conventional manner.

The retainer bracket 80 is a bracket that is separate from the coolant conduit 28 and fastens to the engine 14 via a fastener (not shown) as shown in FIG. 3. The retainer bracket 80 has a curved upper portion that corresponds to the curvature of the adjacent portion of the coolant conduit 28.

The main bracket 82 includes an upper flange 82a, a central portion 82b, a lower end 82c and a cable retaining portion 82d. The upper flange 82a includes a fastener opening dimensioned to receive a fastener (not shown) that fastens the upper flange 82d to the engine 14 or to an intermediary member (not shown) that is fixed to the engine 14.

The central portion 82b is curved to correspond to the curvature of the adjacent portion of the coolant conduit 28. The central portion 82b is fixed to the coolant conduit 28 via an adhesive, glue or other material(s) that can fix a rubber or polymer conduit to a metal bracket such as the main bracket 82.

Figure 19:
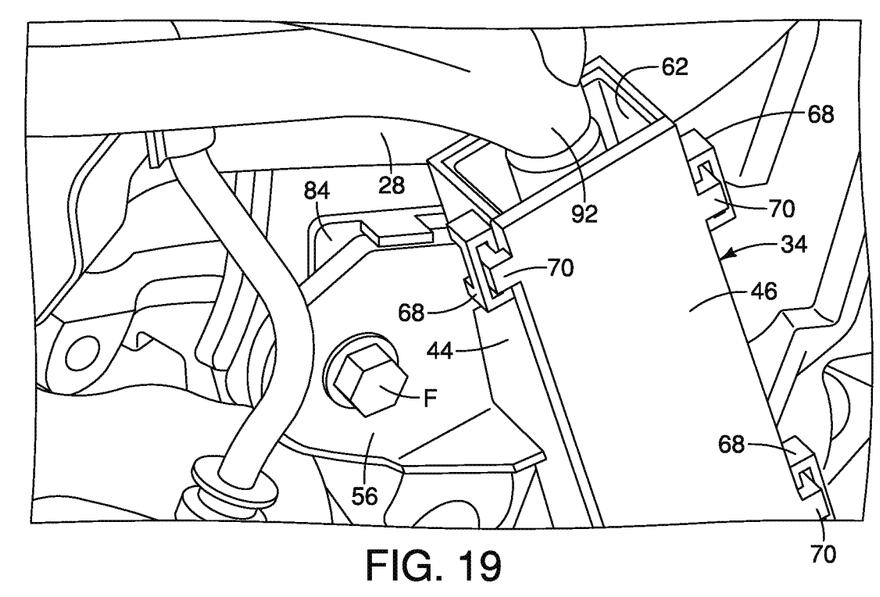
FIG. 19 a side perspective view the coolant conduit and the wiring protector assembly showing the attachment flange of the main body fastened to the secondary bracket via the fastener in accordance with the exemplary embodiment.

The lower end 82c of the main bracket 82 also includes an opening (not shown) such that a fastener F can extend therethrough and attach the lower end 82c of the main bracket 82 to the secondary bracket 84. As shown in FIG. 19, with the wiring protector assembly 34 fully installed, the main body 44 of the wiring protector assembly 34 covers and conceals the lower end 82c of the main bracket 82. Further when installed, the attachment flange 56 of the main body 44 of the wiring protector assembly 34 overlays a rearward portion of the secondary bracket 84 such that the fastener F extends through the opening of the attachment flange 56 and into the opening in the secondary bracket 84. Hence, the wiring protector assembly 34 is attached to the engine 14 via the fastener F that extends through the secondary bracket 84 (fastening thereto) and the second attachment portion 76 of the first bracket 26.

The cable retaining portion 82d of the main bracket 82 is configured to retain either a fluid filled tube, a wiring harness or a portion of the cable 32.

The hose bracket 30 is also fixed or adhered to the coolant conduit 28 and is also configured to receive and retain a fluid filled tube, a wiring harness or a portion of the cable 32.

As shown in FIG. 20 with the cover 46 removed, the cavity 50 of the main body 44 of the wiring protector assembly 34 is exposed showing portions of the electric cable 32 installed therein.

The electric cable 32 includes a first portion 90, a second portion 92, a branch portion 94 and a third portion 96. The first portion 90 and the third portion 96 of the electric cable 32 extend through the lower opening 60 (also referred to as the first open end 60) into the main cavity 50. The second portion 92 of the electric cable 32 extends through upper opening 62 (also referred to as the second open end 62). The branch portion 94 of the electric cable 32 extends through the branch opening 64 (the branch open end 64).

As shown in FIG. 3, the first portion 90 of the electric cable 32 extends downward from the main body 44 of the wiring protector assembly 34 and splits into three different cable sections. One cable section attaches to the starter motor 100, another cable section attaches to the electricity generating alternator 18 and the remaining cable section is attached to an unspecified device of the engine 14.

The second portion 92 of the electric cable 32 branches off to various electric devices and/or components of the vehicle. The branch portion 94 of the electric cable 32 extends upward and can, for example, attach to the battery B shown in FIG. 1.

Figure 15:
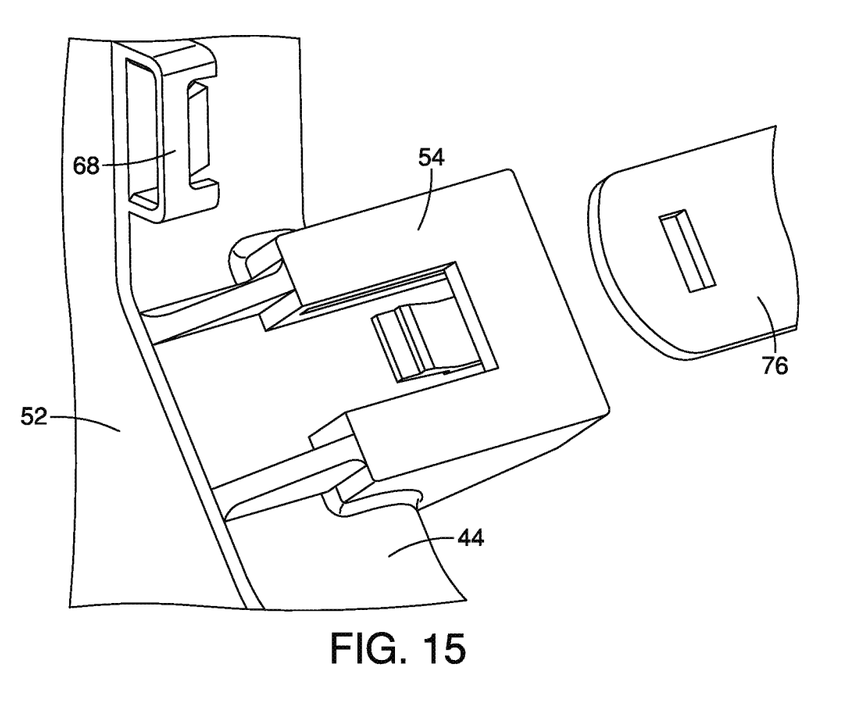
FIG. 15 is a perspective view of a portion of the main body of the wiring protector assembly similar to FIGS. 9 and 10 showing the second attachment portion of the first bracket removed from the bracket receiving structure of the main body of the wiring protector assembly in accordance with the exemplary embodiment.
Figure 16:
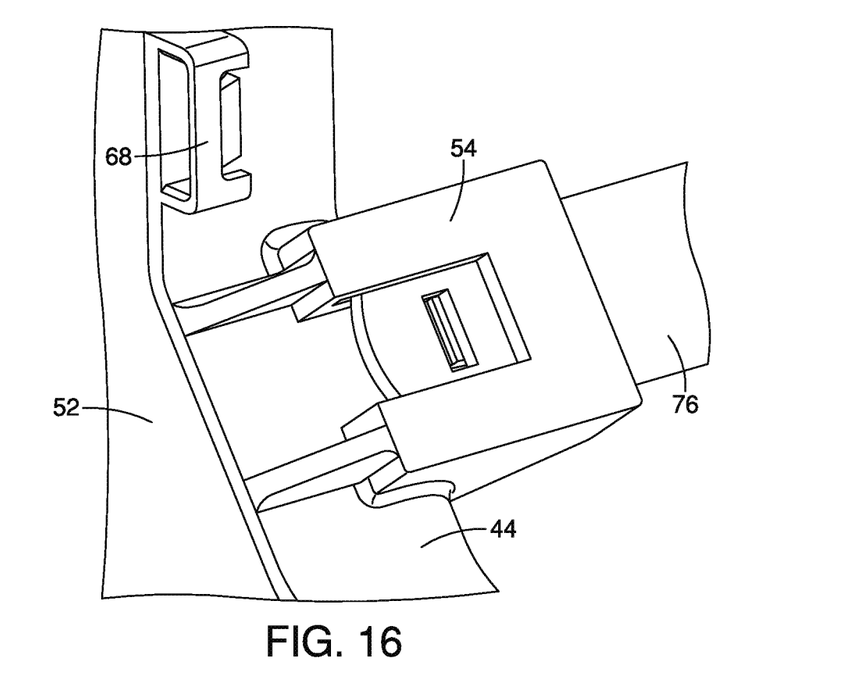
FIG. 16 is a perspective view of the portion of the main body of the wiring protector assembly similar to FIGS. 9, 10 and 15 showing the second attachment portion of the first bracket snap-fitted into the bracket receiving structure of the main body of the wiring protector assembly in accordance with the exemplary embodiment.

The wiring protector assembly 34 is fixed in position by two sets of structures. First as shown in FIGS. 15 and 16, the snap-fitting connection between the bracket receiving structure 54 of the main body 44 and the second attachment portion 76 of the first bracket 26 retains the main body 44 in position. Further as shown in FIGS. 17, 18 and 19, the fastener F extending through the opening in the attachment flange 56 and into the secondary bracket 84 fixes the upper portion of the main body 44 of the wiring protector assembly 34 in position. The secondary bracket 84 is fixed to the main bracket 82, as shown in FIGS. 17 and 18. Further, the fastener F threads into a threaded nut (not shown) that is welded or otherwise fixed to the secondary bracket 84.

With the wiring protector assembly 34 fixed in position, the various branches of the electrical cable 32 are held within the cavities 50 and 52 by the cover 46. Consequently, movement of the electrical cable 32 is restrained. One effect of the inclusion of the wiring protector assembly 34 is that the various branches of the electrical cable 32 are prevented from coming into contact with the exhaust manifold. Another effect of the wiring protector assembly 34 is that the electrical cable 32 is held in a position spaced apart from the metal block of the engine 14. Further, since the wiring protector assembly 34 is made of a heat resistant material, warping and/or deformation of the wiring protector assembly 34 is prevented or at least limited over time.

The various elements and vehicle components not described herein are conventional components that are well known in the art. Since these elements and vehicle components are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part." "section," "portion." "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the wiring protector assembly. Accordingly, these terms, as utilized to describe the present invention should be interpreted relative to a vehicle equipped with the wiring protector assembly.

The terms of degree such as "substantially". "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A wiring protector comprising:
    a vehicle motor having an electrical cable that extends along an exterior area of the vehicle motor and includes a branch of the electrical cable;
    a protector member defining a cavity with the electric cable and the branch being located in the cavity;
    a cover dimensioned and shaped to attach to the protector member covering the cavity, the electric cable and the branch within the cavity, the protector member having a first open end, a second open end and a branch open end that are open to the cavity with a first portion of the electric cable extending through the first open end, a second portion of the electric cable extending through the second open end and the branch of the electric cable extending through the branch open end;
    an accessory fixedly attached to the vehicle motor;
    a first bracket having a first attachment portion dimensioned and shaped to attach to the accessory of the vehicle motor and a second attachment portion; and
    a coolant conduit supported along the vehicle motor adjacent to the electrical cable and the protector member, the protector member having an attachment flange with a fastener receiving aperture for attachment to a second attachment bracket fixed to the coolant conduit.

2. The wiring protector assembly according to claim 1, wherein
    one of the protector member and the cover includes a plurality of snap-fitting structures and the other of the protector member and the cover includes a plurality of snap-fitting projections that are shaped and dimensioned to fit into corresponding ones of the plurality of snap-fitting structures thereby fixedly attaching the cover to the protector member.

3. The wiring protector assembly according to claim 1, wherein
    the protector member and the cover are made of at least one heat resistant material able to withstand temperatures greater than the temperatures reached by an exhaust manifold of an internal combustion engine while operating.

4. The wiring protector assembly according to claim 1, wherein the protector member is disposed so as to be spaced apart from an engine to prevent warping or deforming of the wiring protector assembly.

5. The wiring protector assembly according to claim 1, wherein the protector member includes a bracket receiving structure dimensioned and shaped for connection to a vehicle motor bracket such that the protector member is spaced apart from a metal block of an engine.

6. The wiring protector assembly according to claim 5, wherein
    the bracket receiving structure is dimensioned and shaped for connection to the second attachment portion of the first bracket, the second attachment portion of the first bracket being dimensioned and shaped to snap-fit to the bracket receiving structure.

* * * * *